United States Patent [19]
Chandler et al.

[11] 3,879,478
[45] Apr. 22, 1975

[54] NON-CAKING COMPOSITION OF 2-NITRO-2-METHYL-1-PROPANOL

[75] Inventors: Ollie W. Chandler, Terre Haute; Richard S. Egly, West Terre Haute, both of Ind.

[73] Assignee: Commercial Solvents Corporation, Terre Haute, Ind.

[22] Filed: Feb. 23, 1972

[21] Appl. No.: 228,764

[52] U.S. Cl. ............... 260/632.5; 18/12; 252/384; 260/632 N
[51] Int. Cl. ............................................ C07c 31/02
[58] Field of Search ...... 260/632.5, 632 N; 252/384

[56] References Cited
UNITED STATES PATENTS

| | | | |
|---|---|---|---|
| 2,229,532 | 1/1941 | Vanderbilt | 260/632 N |
| 2,245,040 | 6/1941 | Marks | 252/384 |
| 2,589,330 | 3/1952 | Bradford et al | 252/384 |
| 3,009,882 | 11/1961 | Clarke et al. | 252/384 |

OTHER PUBLICATIONS

Vanderbilt et al., "I.&E.C.," Vol. 32 (1940), pages 34-38.
Commercial Solvents Bulletin, pages 1-3, and identification page.
Perry et al., "Chemical Engineers Handbook," 4th Ed. (1963), section 8, pages 59-64.

*Primary Examiner*—Joseph E. Evans
*Attorney, Agent, or Firm*—Robert H. Dewey; Howard E. Post

[57] ABSTRACT

A pelleted composition consisting of 2-nitro-2-methyl-1-propanol, and particulate stearic acid, 0.5-5.0 percent by weight.

2 Claims, No Drawings

NON-CAKING COMPOSITION OF 2-NITRO-2-METHYL-1-PROPANOL

BACKGROUND OF THE INVENTION

This invention relates to a non-caking composition of 2-nitro-2-methyl-1-propanol. In a particular aspect this invention relates to a pelleted composition of 2-nitro-2-methyl-1-propanol.

2-Nitro-2-methyl-1-propanol is a crystalline material, highly soluble in water. It is shipped in paperboard drums in amounts of up to about 225 lb. This material cakes badly on storage and sets up to a hard mass which is difficult to break up. Even after breaking the mass into lumps, the lumps continue to be troublesome because they are difficult to dissolve in a solvent, e.g. water. Accordingly there is a need for a product free from caking.

SUMMARY OF THE INVENTION

It is the discovery of this invention to provide a pelleted composition consisting of 2-nitro-2-methyl-1-propanol (NMP) and from 0.5 to 5.0 percent by weight stearic acid which is free from caking on storage.

DETAILED DESCRIPTION

The composition of the present invention is a physical mixture obtained by blending NMP crystals with stearic acid particles in blending equipment known in the art. Examples of suitable equipment include but are not limited to ribbon blenders, double cone blenders and twin shell or V-tube blenders. The blended mixture is then passed through a pellet mill to provide pellets of one-eighth to one-fourth inch diameter, preferably about three-sixteenths inch.

The stearic acid employed in the practice of this invention is preferably of good commercial quality having an iodine value in the range of 5–10, preferably 7–8. Either double-pressed or triple-pressed stearic acid can be used, and triple-pressed is preferred. The amount of stearic acid used must be at least 0.5 percent by weight of the NMP. There is no limiting upper concentration, but no advantage is obtained above 5 percent. Preferably the composition consists of about 99 percent NMP with 1 percent stearic acid. The stearic acid must be in particulate form, such as crystalline, but it need not be finely divided. Commercial grade material is satisfactory.

Pelleting of the mixture can be effected by use of any suitable pelleting mill, many of which are known. A satisfactory pellet is formed under conditions such that the friction produced by extrusion of material through the die hole results in heating the material to a temperature about 40°C or above but below about 90°C, the melting point of NMP. Thus a temperature range of about 40° to about 85° yields suitable pellets but 45°–65°C is a preferred range. Generally it has been found that a ¾ inch thick die yields satisfactory pellets of one-eighth to three-sixteenths inch in diameter and a 1 inch thick die yields satisfactory pellets of three-sixteenths to one-fourth inch.

Satisfactory pellets are those which display no significant disintegration after 2 mo. storage nor any firm set into a single mass or into lumps after being dropped. The stored pellets should be loose and free flowing.

The invention will be better understood with reference to the following example. It is understood however that the example is intended for illustration only and it is not intended that the invention be limited thereby.

EXAMPLE

Using a Model CL-Type 3 pellet mill manufactured by the California Pellet Mill Co., 1800 Folsom St. San Francisco, California, commercial grade NMP was pelleted, first without additive and then with stearic acid as shown in the following table. In both cases the material was blended in a ribbon blender before passing into the mill. The stearic acid used was Neo-Fat 1859 marketed by Armour Industrial Chemical Co., Chicago, Illinois. It had an iodine value of 8.1.

| Run No. | Stearic Acid | Feed Rate, lb/hr | Pellet Quality |
|---|---|---|---|
| 1 | 0 | 170 | Poor |
| 2 | 0 | 238 | Poor |
| 3 | 0 | 126 | Poor |
| 4 | 0 | 259 | Poor |
| 5 | 5% | 649 | Good |
| 6 | 1 | 420 | Good |
| 7 | 1 | 339 | Good |
| 8 | 1 | 248 | Good |
| 9 | 1 | 285 | Good |

Run No. 1 was made with a 1 inch thick die but the remainder were made with a ¾ inch die. The diameter of the holes in the die in each run was three-sixteenths inch.

The quality was determined by crushability between the fingers and durability on storage. Storage life of 2 mos. without significant disintegration or caking of the pellets was adopted as the criterion for good quality of pellet. The pellets made without additive appeared satisfactory the first day and were packaged in a 5 gallon paperboard drum. By the second day, however, the material had caked into one large mass which could not be easily removed from the drum. The caked material was not friable and broke up very little when dropped from about 3 feet onto a concrete floor. It was apparent that without additive, the pellets would cake excessively and would not be useful.

We claim:

1. A non-caking pelleted composition consisting of 2-nitro-2-methyl-1-propanol blended with from about 0.5 to about 5 percent of particulate stearic acid based on the weight of the 2-nitro-2-methyl-1-propanol.

2. The composition of claim 1 wherein the stearic acid is present in an amount of about 1 percent based on the weight of the 2-nitro-2-methyl-1-propanol.

* * * * *